United States Patent
Kawatoko et al.

(10) Patent No.: US 11,422,009 B2
(45) Date of Patent: Aug. 23, 2022

(54) ROTARY ENCODER

(71) Applicant: Mitutoyo Corporation, Kanagawa (JP)

(72) Inventors: Osamu Kawatoko, Ibaraki (JP); Hirokazu Kobayashi, Saitama (JP)

(73) Assignee: MITUTOYO CORPORATION, Kawasaki (JP)

( * ) Notice: Subject to any disclaimer, the term of this patent is extended or adjusted under 35 U.S.C. 154(b) by 23 days.

(21) Appl. No.: 17/144,496

(22) Filed: Jan. 8, 2021

(65) Prior Publication Data

US 2021/0215511 A1   Jul. 15, 2021

(30) Foreign Application Priority Data

Jan. 14, 2020 (JP) .............................. JP2020-003469

(51) Int. Cl.
*G01D 5/20* (2006.01)
*G01B 7/30* (2006.01)
*G01R 1/00* (2006.01)

(52) U.S. Cl.
CPC .................. *G01D 5/20* (2013.01); *G01B 7/30* (2013.01)

(58) Field of Classification Search
CPC .... G01D 1/00; G01B 1/00; G01L 1/00; G01P 1/00; G01R 1/00
See application file for complete search history.

(56) References Cited

U.S. PATENT DOCUMENTS

| 2004/0010928 A1 | 1/2004 | Steinlechner et al. |
| 2006/0250128 A1 | 11/2006 | Tahara et al. |
| 2012/0235616 A1 * | 9/2012 | Meyer .................... H02K 29/08 318/400.39 |
| 2013/0187639 A1 * | 7/2013 | Sasaki ...................... G01B 7/30 324/207.17 |
| 2013/0200884 A1 * | 8/2013 | Manabe ............... G01D 5/2046 324/207.16 |

(Continued)

FOREIGN PATENT DOCUMENTS

| EP | 2 372 313 A1 | 10/2011 |
| JP | 2006-322927 | 11/2006 |

OTHER PUBLICATIONS

European Search Report dated May 11, 2021, 6 pages.

*Primary Examiner* — Jermele M Hollington
*Assistant Examiner* — Temilade S Rhodes-Vivour
(74) *Attorney, Agent, or Firm* — Rankin, Hill & Clark LLP (57) ABSTRACT

A rotary encoder that is capable of securing a sufficient synthesis tolerance while achieving miniaturization is provided. The rotary encoder 1 includes a rotor 3, a stator 4, and a calculating unit 5 for calculating the rotation angle. The rotor 3 has a first rotor pattern 31 with a plurality of unit patterns 310 arranged along the measurement direction around the rotating shaft 2, and a second rotor pattern 32 with fewer unit patterns 320 than the plurality of unit patterns 310 in the first rotor pattern 310 arranged along the measurement direction. The number of the plurality of unit patterns 310 of the first rotor pattern 31 and the number of the plurality of unit patterns 320 of the second rotor pattern 32 are provided such that the maximum common divisor therebetween is two or more. The calculating unit calculates the rotation angle of the rotor 3 based on the detection signals from the first rotor pattern 31 and the second rotor pattern 32.

2 Claims, 5 Drawing Sheets

(56) References Cited

U.S. PATENT DOCUMENTS

| | | | |
|---|---|---|---|
| 2016/0003646 A1* | 1/2016 | Yoshida | G01D 5/34784 |
| | | | 310/68 B |
| 2016/0178407 A1* | 6/2016 | Yoshida | G01D 5/30 |
| | | | 250/231.13 |
| 2020/0083784 A1* | 3/2020 | Fukuda | H02K 11/22 |

* cited by examiner

ROTARY ENCODER

CROSS-REFERENCE TO RELATED APPLICATION

This non-provisional application claims priority under 35 U.S.C. § 119(a) from Japanese Patent Application No. 2020-003469, filed on Jan. 14, 2020, the entire contents of which are incorporated herein by reference.

BACKGROUND

Technical Field

The present invention relates to a rotary encoder.

Background Art

Conventionally, a rotary encoder that comprises a rotor rotating in a measurement direction about a predetermined rotating shaft, a stator receiving a detection signal from the rotor, and a calculating unit for calculating a rotation angle based on a detection signal received by the stator is known. The rotary encoders are used in micrometers, micrometer heads, height gauges, Holtests (inside diameter measuring tools), and the like. As detection methods in such rotary encoders, there are an optical type, an electromagnetic induction type, a magnetic type, or the like.

For example, an absolute rotary encoder described in JP2006-322927A includes a rotor having a track group in which tracks are arranged concentrically, and a stator having a transmission winding group and a reception winding group, which are arranged to be flux-coupled with the track group. Each track in the track group includes arc portions of first and second radii disposed on the rotor and is one continuous ring of magnetic flux-coupled windings centered on an axis. The number of arc portions of at least two tracks in the track group differs from each other. Specifically, the absolute rotary encoder calculates the absolute angle based on the received signal obtained from the two tracks by using a track with a 36-degree period and a track with a 40-degree period. This allows the absolute encoder to operate intermittently by calculating the absolute angle only when necessary, thus reducing the frequency of angle detection and reducing the power consumption.

SUMMARY OF THE INVENTION

Problems to be Solved by the Invention

Here, even if the physical size of the rotary encoder can be reduced, the machining and assembly accuracy of the parts cannot be easily improved. In addition, an inter-track error, which is the error of the difference in the detection signal detected from two tracks, may worsen with miniaturization. The inter-track error is caused by a misalignment between the rotor and the stator or the like. Therefore, the rotary encoder has a synthesis tolerance, which is an allowable range of inter-track error, so that the calculation of the absolute angle can be performed even if there is a certain amount of inter-track error, assuming a misalignment between the rotor and the stator or the like. If the inter-track error exceeds the synthesis tolerance, the rotary encoder cannot calculate the absolute angle.

As the size of the rotary encoder is reduced, the synthesis tolerance becomes smaller, and the inter-track error may worsen. As a result, it is difficult to achieve absolute angle calculation because the inter-track error can easily exceed the synthetic tolerance due to the miniaturization.

An object of the present invention is to provide a rotary encoder that is capable of securing a sufficient synthesis tolerance while achieving miniaturization.

Means for Solving the Problems

A rotary encoder of the present invention comprises a rotor rotating in the measurement direction about a predetermined rotating shaft, a stator receiving a detection signal from the rotor, and a calculating unit for calculating a rotation angle based on a detection signal received by the stator. The rotor includes a first rotor pattern with a plurality of unit patterns arranged along the measurement direction around the rotating shaft, and a second rotor pattern with fewer unit patterns than the plurality of unit patterns in the first rotor pattern arranged along the measurement direction around the rotating shaft. The number of the plurality of unit patterns of the first rotor pattern and the number of the plurality of unit patterns of the second rotor pattern is provided such that the maximum common divisor therebetween is two or more. The calculating unit calculates the rotational angle of the rotor based on the detection signals detected from each of the first and second rotor patterns by the stator.

According to the present invention, the number of unit patterns of the first rotor pattern and the number of unit patterns of the second rotor pattern in the rotor are provided such that the maximum common divisor of each other is two or more. Thereby, the period of the first rotor pattern and the second rotor pattern in which the detection signal used for the calculation is detected is half or less than the case where the maximum common divisor is one. In addition, compared to the case where the maximum common divisor is one, the synthesis tolerance is more than twice the synthesis tolerance when the rotary encoder 1 is miniaturized without changing the rotor patterns. Consequently, the synthesis tolerance can be maintained close to the value before miniaturization. Therefore, the rotary encoder can be miniaturized, while maintaining a sufficient synthetic tolerance.

The number of the plurality of unit patterns of the first rotor pattern and the number of the plurality of unit patterns of the second rotor pattern are preferably provided to be even numbers.

Here, if the number of the plurality of unit patterns of the first rotor pattern and the number of the plurality of unit patterns of the second rotor pattern are provided to be odd numbers, errors may easily occur in the rotation angle, which is the calculation result of the calculating unit based on the detection signals from the first and second rotor patterns, and it may be difficult to maintain the accuracy.

However, according to such a configuration, the number of the plurality of unit patterns of the first rotor pattern and the number of the plurality of unit patterns of the second rotor pattern are provided to be even numbers. Thus it is possible to prevent the accuracy of the calculation results of the calculating unit based on the detection signals from the first rotor pattern and the second rotor pattern from deteriorating and maintain the accuracy.

The first rotor pattern and the second rotor pattern are preferably continuous magnetic flux coupling windings centered on the rotating shaft 2, respectively. The stator is preferably an electromagnetic induction type with a transmission winding group arranged to be magnetic flux-coupled with the first rotor pattern and the second rotor pattern, and a receiving winding group arranged to be magnetic flux-coupled with the first rotor pattern and the second rotor pattern.

According to such a configuration, since the rotary encoder is electromagnetic induction type, the design of the number of the plurality of unit patterns of the first rotor pattern and the number of the plurality of unit patterns of the second rotor pattern and the design of the stator corresponding to the first rotor pattern and the second rotor pattern can be easily performed based on the conventional technology.

DETAILED DESCRIPTION OF THE EMBODIMENTS

Hereinafter, an embodiment of the present invention will be illustrated and described with reference to reference numerals assigned to respective elements in the drawings.

Figure 1:
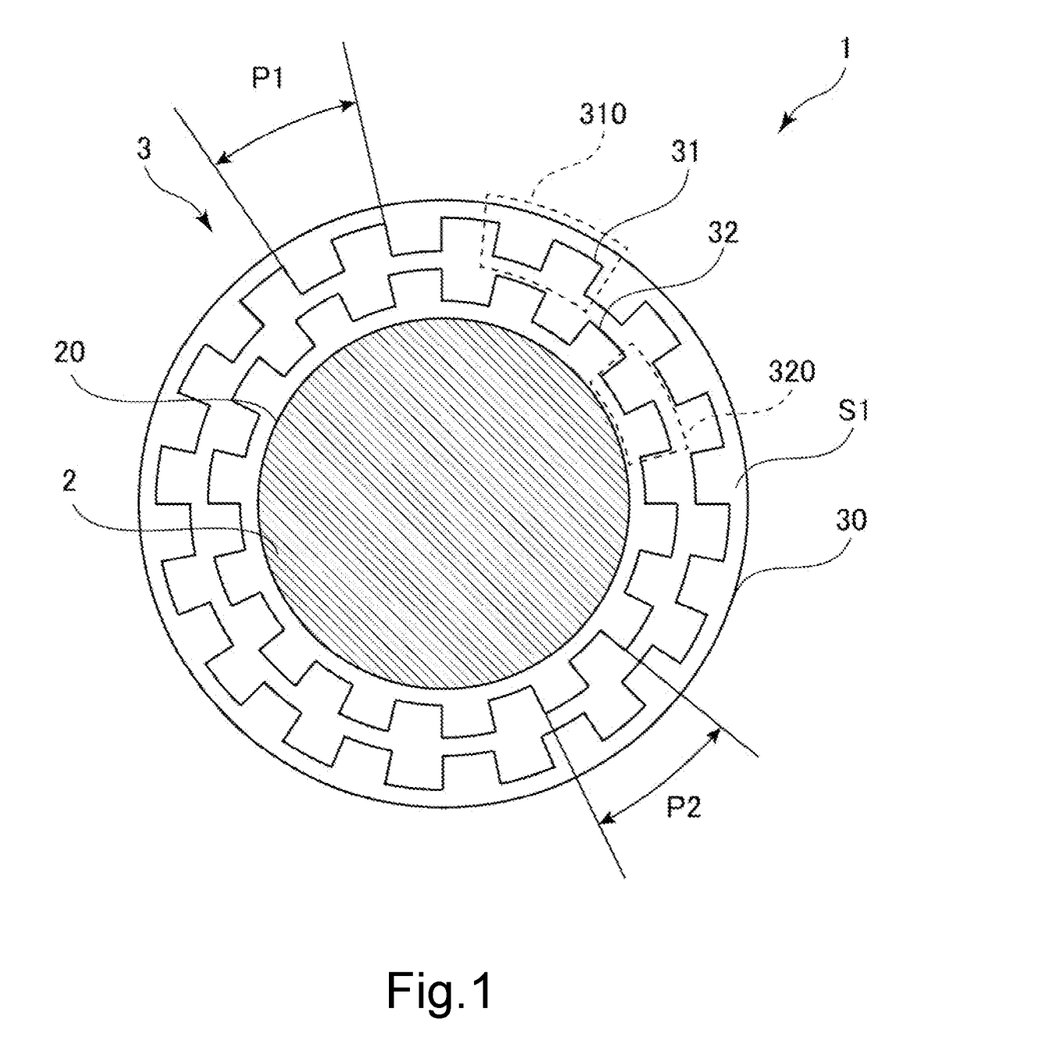
FIG. 1 is a plan view showing a rotor in a rotary encoder according to an embodiment of the present invention.
Figure 2:
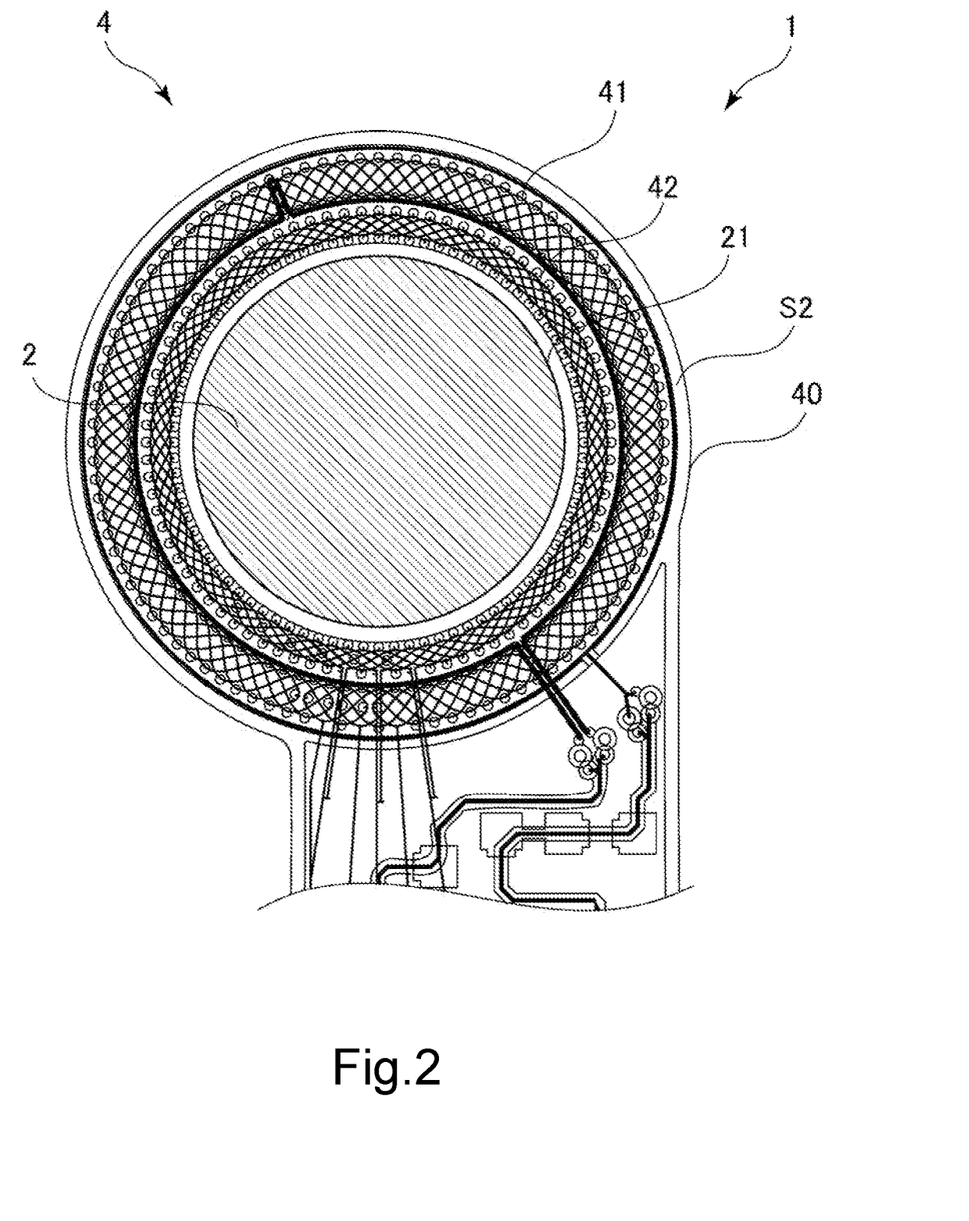
FIG. 2 is a plan view showing a stator in the rotary encoder.

FIG. 1 is a plan view showing a rotor 3 in a rotary encoder 1 according to the embodiment of the present invention. FIG. 2 is a plan view showing a stator 4 in the rotary encoder 1.

As shown in FIGS. 1 and 2, the rotary encoder 1 includes the rotor 3 which rotates in the measurement direction about a predetermined rotating shaft (an axis of rotation) 2 and the stator 4 for receiving a detection signal for detecting the rotation angle from the rotor 3. The rotary encoder 1 is used in a micrometer which is a measuring device (not shown). The rotary encoder 1 is provided inside the micrometer. In the micrometer, the rotor 3 rotates with respect to the stator 4 in the measurement direction. The micrometer detects the rotation angle of the rotor 3 with respect to the stator 4, and outputs the detection result to a display means (not shown) or the like.

The rotating shaft 2 is a cylindrical member that supports the rotor 3 and stator 4. The rotating shaft 2 can be made of metal, glass, resin, or other materials. The end of the rotating shaft 2 is provided with a gauge head that contacts a measurement target (not shown).

The rotor 3, as shown in FIG. 1, includes an insulating substrate 30, a first rotor pattern 31, a second rotor pattern 32, and a shaft hole 20 through which the rotating shaft 2 passes. The insulating substrate 30 may be made of a material such as a glass epoxy resin, glass, or silicon. The shaft hole 20 is provided in the center of the insulating substrate 30 so as to allow the rotating shaft 2 to be inserted in a direction orthogonal to the surface S1. The insulating substrate 30 has a surface S1 facing the stator 4 and orthogonal to the rotating shaft 2. The insulating substrate 30 is formed in a substantially circular shape. The insulating substrate 30 is formed so that the outer diameter of the surface S1 is 13.5 mm and the inner diameter of the shaft hole 20 through which the rotating shaft 2 passes is 8 mm.

The first rotor pattern 31 and the second rotor pattern 32 are continuous magnetic flux coupling windings centered on the rotating shaft 2, respectively. The first rotor pattern 31 and the second rotor pattern 32 are provided on the surface S1 of the insulating substrate 30 along the circumferential direction, which is the measurement direction so as to face the stator 4. In the first rotor pattern 31, a plurality of unit patterns 310 are arranged along the measurement direction about the rotating shaft 2 as the center. In the first rotor pattern 32, fewer unit patterns 320 than the plurality of unit patterns 310 in the first rotor pattern 31 are arranged along the measurement direction about the rotating shaft 2 as the center. Specifically, the first rotor pattern 31 and the second rotor pattern 32 are formed of a conductor that generates electromotive current by electromagnetic induction. Each of the first rotor pattern 31 and the second rotor pattern 32 has a conductor wire formed into a single loop shape and is formed in a substantially wavy shape or a substantially gear shape. For the first rotor pattern 31 and the second rotor pattern 32, materials with low electrical resistance, such as copper and gold, are used.

The plurality of unit patterns 310 of the first rotor pattern 31 are provided such that a magnetic field is generated at a predetermined pitch P1 along the measurement direction. Specifically, the plurality of unit patterns 310 of the first rotor pattern 31 are provided such that the magnetic field is generated at the pitch P1 having a period of 22.5 degrees.

A plurality of unit patterns 320 of the second rotor pattern 32 are provided such that a magnetic field is generated at a predetermined pitch P2. Specifically, the plurality of unit patterns 320 of the second rotor pattern 32 are provided such that the magnetic field is generated at the pitch P2 having a period of about 25.71 degrees.

The number of the plurality of unit patterns 310 of the first rotor pattern 31 and the number of the plurality of unit patterns 320 of the second rotor pattern 32 are provided such that the maximum common divisor therebetween is two or more.

Specifically, the number of the plurality of unit patterns 310 of the first rotor pattern 31 and the number of the plurality of unit patterns 320 of the second rotor pattern 32 are provided to be even numbers. In the present embodiment, the number of the plurality of unit patterns 310 of the first rotor pattern 31 is 16, and the number of the plurality of unit patterns 320 of the second rotor pattern 32 is 14. Therefore, the number of the plurality of unit patterns 310 of the first rotor pattern 31 and the number of the plurality of unit patterns 320 of the second rotor pattern 32 are provided such that the maximum common divisor therebetween is two.

The stator 4 includes, as shown in FIG. 2, an insulating substrate 40, a transmission winding group 41, a receiving winding group 42, and a shaft hole 21 through which the rotating shaft 2 passes. Therefore, the rotary encoder 1 is an electromagnetic induction type.

The shaft hole 21 is provided in the center of the insulating substrate 40 so as to allow the rotating shaft 2 to be inserted in a direction orthogonal to a surface S2. The insulating substrate 40 has the surface S2 facing the rotor 3 and orthogonal to the rotating shaft 2. The insulating substrate 40 is formed in a substantially circular shape. The insulating substrate 40 may be made of a material such as a glass epoxy resin, glass, or silicon.

The transmitting winding group 41 is arranged to be magnetic flux-coupled with the first rotor pattern 31 and the second rotor pattern 32. The receiving winding group 42 is arranged to be magnetic flux-coupled with the first rotor pattern 31 and the second rotor pattern 32. The transmission winding group 41 and the receiving winding group 42 are designed to correspond to each of the plurality of unit patterns 310 of the first rotor pattern 31 and the plurality of unit patterns 320 of the second rotor pattern 32. For the transmission winding group 41 and the receiving winding group 42, materials with low electrical resistance, such as copper and gold, are used.

First, the rotary encoder 1 generates an electromotive current in the first rotor pattern 31 and the second rotor pattern 32 of the rotor 3 using the transmission winding group 41 of the stator 4. Next, the receiver winding group 42 of stator 4 receives the changes in the magnetic field applied from the first rotor pattern 31 and second rotor pattern 32 of rotor 3. The rotary encoder 1 measures the rotation angle, which is the amount of relative movement between the rotor 3 and the stator 4, based on changes in the magnetic field.

The rotary encoder 1 is further provided with calculating unit (not shown), which calculates the rotation angle based on the detection signal received by the stator 4. The calculating unit calculates the rotation angle of the rotor 3 based on the detection signals detected by the stator 4 from the first rotor pattern 31 and the second rotor pattern 32.

Here, two methods of detecting the rotation angle of the rotor 3 with respect to the stator 4 are known: the incremental method (INC method) and the absolute method (ABS method).

The INC method continuously detects incremental patterns (INC patterns) at a fixed pitch in the rotor and counts up or down the number of detected INC patterns to detect the rotation angle.

The ABS method is a method of calculating an absolute position. As the ABS method, there are a method of synthesizing a plurality of incremental signals (INC signals) detected from a plurality of tracks each having an INC pattern having a different pitch, a method of detecting an absolute pattern (ABS signals) randomly provided and analyzing the ABS pattern, or the like.

In the present embodiment, the first rotor pattern 31 provided at pitch P1 and the second rotor pattern 32 provided at pitch P2 correspond to the INC pattern, respectively. The calculating unit can calculate the absolute angle by synthesizing the INC signals, which are detection signals detected from the first rotor pattern 31 and the second rotor pattern 32. The rotary encoder 1 achieves intermittent operation by detecting the absolute angle and calculating the absolute angle only when necessary, without always detecting the angle. This allows the rotary encoder 1 to reduce the frequency of angle detection and reduce power consumption.

Figure 3A:
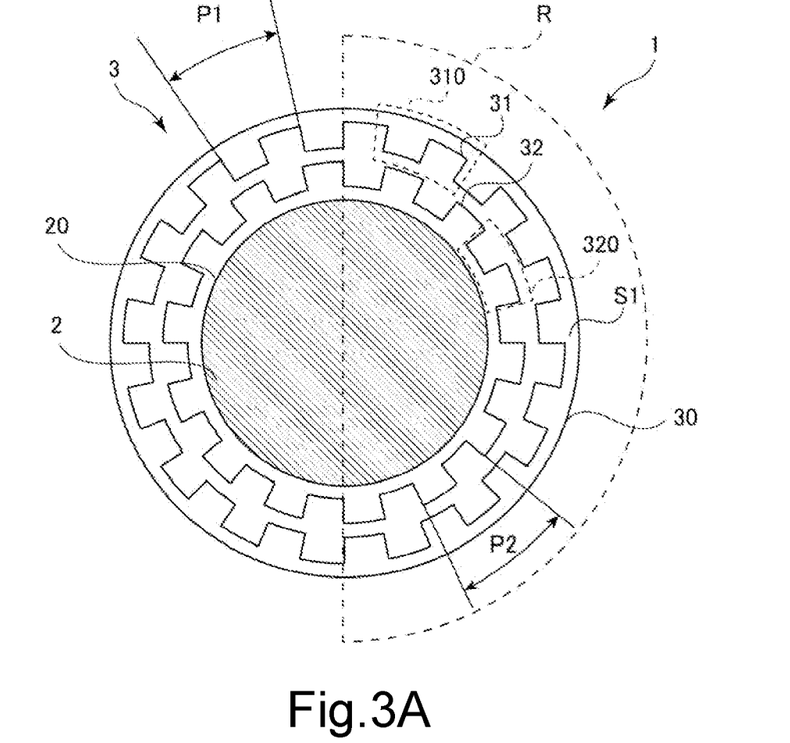
FIG. 3A is a plan view showing a rotor 3 in the rotary encoder 1.
Figure 3B:
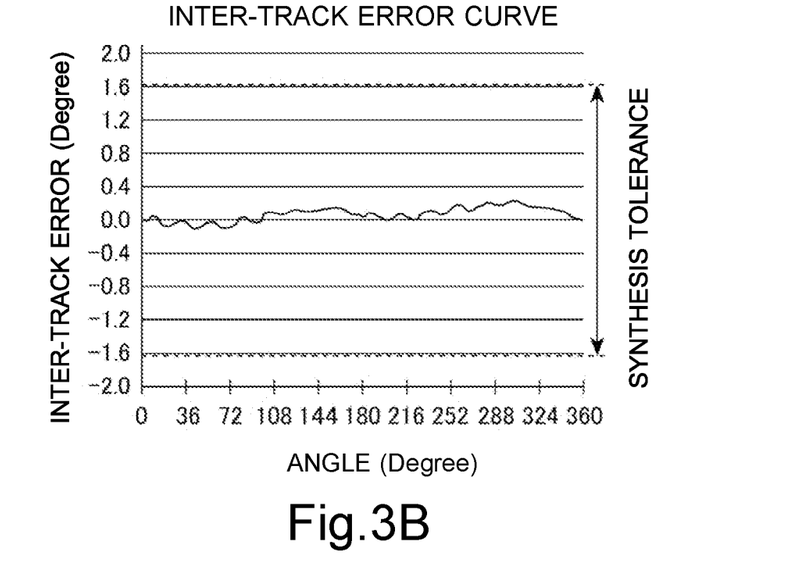
FIG. 3B is a graph showing the relation between inter-track error and synthesis tolerance in rotary encoder 1.
Figure 4A:
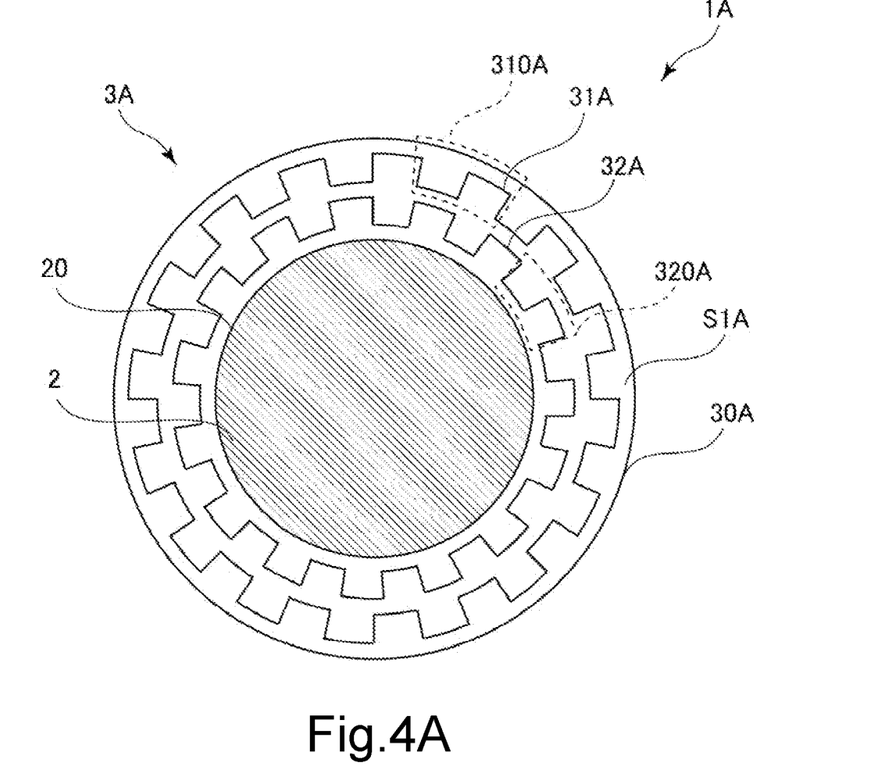
FIG. 4A is a plan view showing a rotor 3A in a conventional miniaturized rotary encoder 1A.
Figure 4B:
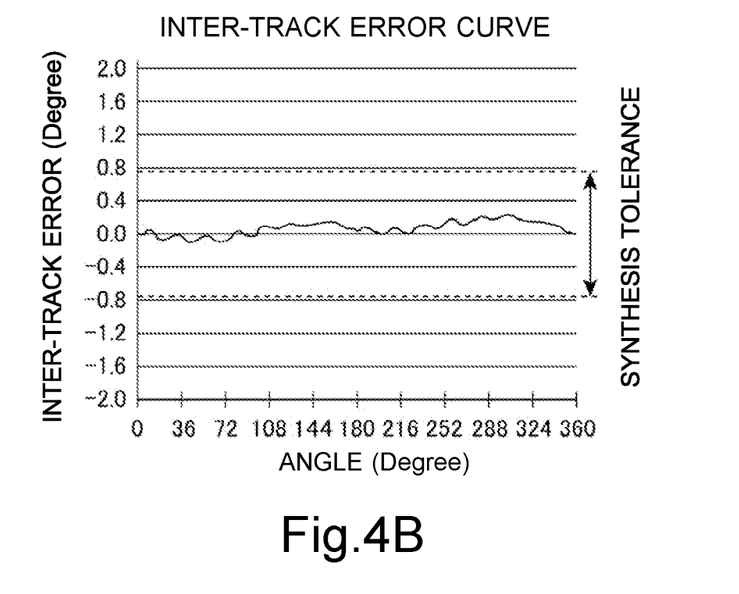
FIG. 4B is a graph showing the relation between inter-track error and synthesis tolerance in a conventional miniaturized rotary encoder 1A.
Figure 5A:
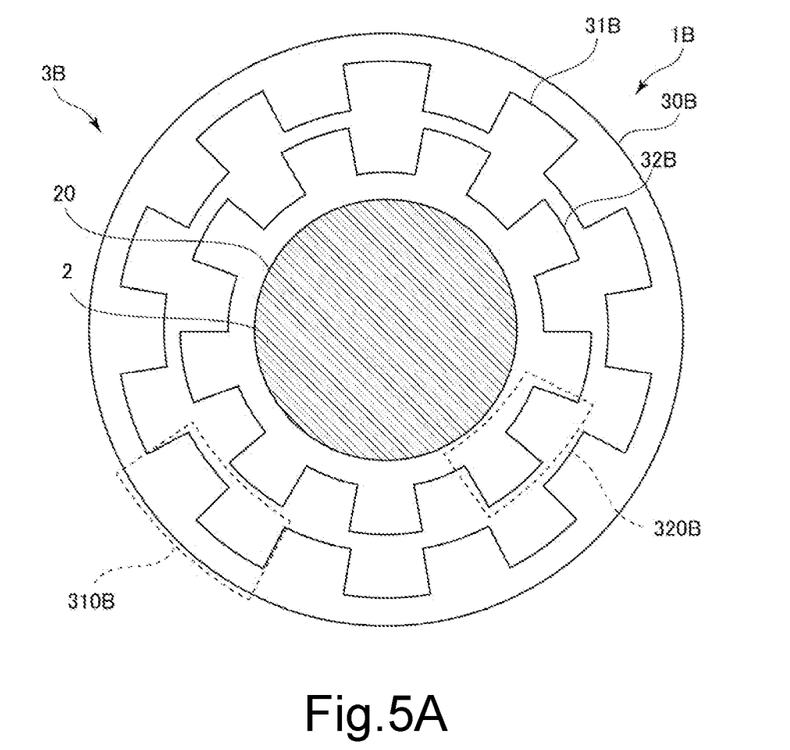
FIG. 5A is a plan view showing a rotor 3B in a conventional pre-miniaturized rotary encoder 1B.
Figure 5B:
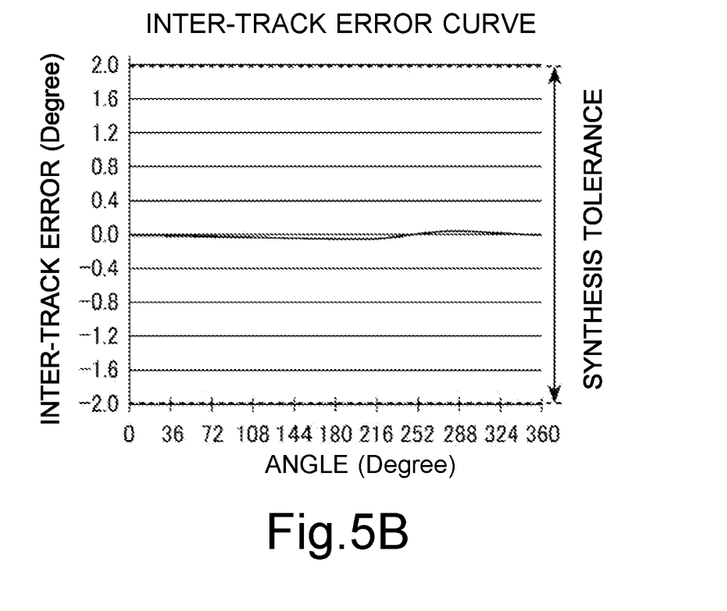
FIG. 5B is a graph showing the relation between inter-track error and synthesis tolerance in a conventional pre-miniaturized rotary encoder 1B.

FIGS. 3A to 5B show the relationship between the inter-track error and the synthesis tolerance. Specifically, FIG. 3A is a plan view of the rotor 3 of the rotary encoder 1. FIG. 3B is a graph showing the relation between inter-track error and synthesis tolerance in rotary encoder 1. FIG. 4A is a plan view showing a rotor 3A in a conventional miniaturized rotary encoder 1A. FIG. 4B is a graph showing the relation between inter-track error and synthesis tolerance in a conventional miniaturized rotary encoder 1A. FIG. 5A is a plan view showing a rotor 3B in a conventional pre-miniaturized rotary encoder 1B. FIG. 5B is a graph showing the relation between inter-track error and synthesis tolerance in a conventional pre-miniaturized rotary encoder 1B. The graphs in FIGS. 3B, 4B, and 5B show the inter-track error curve, with the vertical axis being the inter-track error and the horizontal axis being the angle. The range where the upper and lower limits are indicated by the broken line indicates the synthesis tolerance.

As shown in FIG. 3A, the number of the plurality of unit patterns 310 of the first rotor pattern 31 and the number of the plurality of unit patterns 320 of the second rotor pattern 32 in the rotor 3 are provided such that the maximum common divisor therebetween is two. Thus, when the absolute angle is calculated using the ABS method described above, the same absolute angle will appear in two places in one rotation. Therefore, the rotary encoder 1 performs the detection of the rotation angle using, for example, the first rotor pattern 31 and the second rotor pattern 32 within the range R of the dashed line in FIG. 3A.

When the period of the first rotor pattern is λ1 and the period of the second rotor pattern is λ2, the synthesis tolerance δABS at the rotary encoder can be obtained by the formula (1).

$$\delta ABS = |\lambda 1 - \lambda 2| \tag{1}$$

In the present embodiment, the number of the plurality of unit patterns 310 of the first rotor pattern 31 is 16, and λ1 is 22.5 degrees. The number of the plurality of unit patterns 320 of the second rotor pattern 32 is 14, and λ2 is about 25.71 degrees. Therefore, the synthesis tolerance δABS at rotary encoder 1 is about 3.2142 degrees.

As shown in FIG. 4A, in the conventional miniaturized rotary encoder 1A, the number of the plurality of unit patterns 310A of the first rotor pattern 31A is 16, and λ1 is 22.5 degrees. The number of the plurality of unit patterns 320A of the second rotor pattern 32A is 15, and λ2 is 24 degrees. The number of the plurality of unit patterns 310A of the first rotor pattern 31A and the number of the plurality of unit patterns 320A of the second rotor pattern 32A are provided in such a way that the maximum common divisor therebetween is one. When the synthesis tolerance δABS in the rotary encoder 1A is obtained by the formula (1), the synthesis tolerance δABS is 1.5 degrees. The insulating substrate 30A is formed in such a way that the outer diameter is 13.5 mm and the inner diameter of the shaft hole 20 through which the rotating shaft 2 passes is 8 mm at a surface S1A.

And, as shown in FIG. 5A, in the conventional pre-miniaturized rotary encoder 1B, the number of the plurality of unit patterns 310B of the first rotor pattern 31B is 10, and λ1 is 36 degrees. The number of the plurality of unit patterns 320B of the second rotor pattern 32B is 9, and λ2 is 40 degrees. The number of the plurality of unit patterns 310B of the first rotor pattern 31B and the number of the plurality of unit patterns 320B of the second rotor pattern 32B are provided in such a way that the maximum common divisor therebetween is one. When the synthesis tolerance δABS in the rotary encoder 1B is obtained by the formula (1), the synthesis tolerance δABS is 4 degrees. The insulating substrate 30B is formed in such a way that the outer diameter is 18.2 mm and the inner diameter of the shaft hole 20 through which the rotating shaft 2 passes is 8 mm at the surface S1B.

The synthesis tolerances δABS for each of the rotary encoders 1 of the present invention, the conventional miniaturized rotary encoder 1A, and the conventional pre-miniaturized rotary encoder 1B vary with the number of the plurality of unit patterns 310, 310A, 310B of the first rotor pattern 31, 31A, 31B and the number of the plurality of unit patterns 320, 320A, 320B of the second rotor pattern 32, 32A, 32B.

Specifically, in a rotary encoder 1A in which the conventional rotary encoder 1B is miniaturized and provided such that the number of the plurality of unit patterns 310A of the first rotor pattern 31A and the number of the plurality of unit patterns 320A of the second rotor pattern 32A has a maximum common divisor therebetween of one, as shown in FIGS. 4B and 5B, the synthesis tolerance δABS=1.5 degrees, which is less than half the synthesis tolerance δABS=4 degrees of the conventional rotary encoder 1B.

In contrast, as shown in FIG. 3B, in the rotary encoder 1 of the present invention where the number of the plurality of unit patterns 310 of the first rotor pattern 31 and the number of the plurality of unit patterns 320 of the second rotor pattern 32 are provided such that the maximum common divisor therebetween is two, the synthesis tolerance δABS=about 3.2142 degrees. In other words, the rotary encoder 1 has a synthesis tolerance δABS of about twice the synthesis tolerance δABS=1.5 degrees of the conventional miniaturized rotary encoder 1A.

Therefore, the rotary encoder 1 can ensure a sufficient synthesis tolerance δABS, similar to that of the conventional pre-miniaturized rotary encoder 1B, while maintaining a small size.

According to the present embodiment, the following functions and effects can be achieved.

(1) The number of the plurality of unit patterns 310 of the first rotor pattern 31 and the number of the plurality of unit patterns 320 of the second rotor pattern 32 in the rotor 3 are provided such that the maximum common divisor therebetween is two or more. With such a configuration, the period of the first rotor pattern 31 and the second rotor pattern 32 in which the detection signal used for the calculation is detected is half or less than the case where the maximum common divisor is one. Compared to the case where the maximum common divisor is one, the synthesis tolerance is more than twice the synthesis tolerance when the rotary encoder 1 is miniaturized without changing the rotor patterns. As a result, the synthesis tolerance can be maintained close to the value before miniaturization. Therefore, the rotary encoder 1 can be miniaturized, while maintaining a sufficient synthetic tolerance.

(2) The number of the plurality of unit patterns 310 of the first rotor pattern 31 and the number of the plurality of unit patterns 320 of the second rotor pattern 32 are provided to be even numbers. With such a configuration, it is possible to prevent the accuracy of the calculation result of the calculating unit based on the detection signals from the first rotor pattern 31 and the second rotor pattern 32 from being lowered, and to maintain the accuracy.

(3) Since the rotary encoder 1 is electromagnetic induction type, the design of the number of the plurality of unit patterns 310 of the first rotor pattern 31 and the number of the plurality of unit patterns 320 of the second rotor pattern 32 and the design of the stator 4 corresponding to the first rotor pattern 31 and the second rotor pattern can be easily performed based on the conventional technology.

Modification of Embodiment

Note that the present invention is not limited to the above embodiment, and modification, improvement, and the like within the spirit and the scope of the present invention are included.

For example, in the embodiment described above, the rotary encoder 1 is used in a micrometer as a measuring device, the rotary encoder may be used in other measuring devices such as micrometer heads, height gauges, or Holtests (inside diameter measuring tools). The rotary encoder may be used in a device other than a measurement device such as a sensor.

In the aforementioned embodiment, the rotary encoder 1 is electromagnetic induction type, but the stator may not be equipped with a transmission winding group, and the first and second rotor patterns in the rotor may be of the magnetic type in which the magnets are arranged in such a way that the first and second rotor patterns in the rotor alternate with the S and N poles along the measurement direction. Furthermore, the first and second rotor patterns in the rotor may be of the optical type with slits and other necessary optics.

In short, the rotary encoder is not particularly limited with respect to the implementation form or detection method used. The rotary encoder can be used in other measuring devices and the like. The equipment in which the rotary encoder of the present invention is implemented is not particularly limited.

In the aforementioned embodiment, the number of the plurality of unit patterns 310 of the first rotor pattern 31 is 16, and the number of the plurality of unit patterns 320 of the second rotor pattern 32 is 14, both of which are provided to be even numbers. However, any or both may be provided to be an odd number.

In the aforementioned embodiment, the number of the plurality of unit patterns 310 of the first rotor pattern 31 and the number of the plurality of unit patterns 320 of the second rotor pattern 32 are provided such that the maximum common divisor therebetween is two, but the maximum common divisor therebetween may be three or four. In short, the number of the plurality of unit patterns of the first rotor pattern and the number of the plurality of unit patterns of the second rotor pattern need only be provided such that the maximum common divisor therebetween is two or more.

In the aforementioned embodiment, the calculating unit calculates the absolute angle by synthesizing the INC signal, which is a detection signal detected from each of the first rotor pattern 31 and the second rotor pattern 32, but the rotation angle may be calculated by other methods. In short, the calculating unit need only be able to calculate the rotational angle of the rotor based on the detection signals detected from each of the first and second rotor patterns by the stator.

In the aforementioned embodiment, the rotor 3 has two rotor patterns, a first rotor pattern 31 and a second rotor pattern 32, but the rotor may have two or more rotor patterns. In this case, in two or more rotor patterns, any rotor pattern may be treated as the first and second rotor patterns, as long as the first rotor pattern has a plurality of unit patterns along the measurement direction around the rotating shaft, and the second rotor pattern has fewer unit patterns than the plurality of unit patterns in the first rotor pattern along the measurement direction around the rotating shaft.

In the aforementioned embodiment, the insulating substrate 30 in the rotor 3 is formed in such a way that the outer diameter is 13.5 mm and the inner diameter of the shaft hole 20 through which the rotating shaft 2 passes is 8 mm at the face S1, but the insulating substrate in the rotor may be formed in any size, shape or the like. Further, in the aforementioned embodiment, the first rotor pattern 31 and the second rotor pattern 32 are provided on the surface S1, i.e., a plane surface, of the insulating substrate 30 so as to be opposite the stator 4. However, the first rotor pattern and the second rotor pattern may be provided on a curved surface as long as they are opposite the stator. For example, the first rotor pattern and the second rotor pattern may be provided on a circumferential surface in a cylindrical rotor. Further, in the aforementioned embodiment, the surface S1 of the rotor 3 and the surface S2 of the stator 4 are opposed to each other, and the stator 4 detects the rotation angle of the surface S1 of the rotor 3 with respect to the surface S2, but the rotor may have an cylindrical member, and the stator may be a ring-shaped member capable of inserting and rotating the cylindrical member of the rotor in the center. In short, the form and shape of the rotor and stator can be formed in any way.

INDUSTRIAL APPLICABILITY

As described above, the present invention can be suitably applied to a rotary encoder.

What is claimed is:

1. An electromagnetic induction rotary encoder that comprises a rotor rotating in the measurement direction about a predetermined rotating shaft, a stator receiving a detection signal from the rotor, and a calculating unit for calculating a rotation angle based on a detection signal received by the stator, wherein the rotor comprises:
a first rotor pattern with a plurality of unit patterns arranged along the measurement direction about the rotating shaft as the center; and
a second rotor pattern with unit patterns, which are smaller in number than the plurality of unit patterns in the first rotor pattern, arranged along the measurement direction about the rotating shaft as the center,
wherein the number of the plurality of unit patterns of the first rotor pattern and the number of the plurality of unit patterns of the second rotor pattern is provided such that the maximum common divisor therebetween is two or more,
the calculating unit calculates the rotational angle of the rotor based on the detection signals detected from each of the first and second rotor patterns by the stator,
the first rotor pattern and the second rotor pattern are continuous magnetic flux coupling windings centered on the rotating shaft, respectively, and
the stator comprises:
a transmitting winding group arranged to be magnetic flux-coupled with the first rotor pattern and the second rotor pattern; and
a receiving winding group arranged to be magnetic flux-coupled with the first rotor pattern and the second rotor pattern.

2. The electromagnetic induction rotary encoder according to claim 1, wherein the number of the plurality of unit patterns of the first rotor pattern and the number of the plurality of unit patterns of the second rotor pattern are provided to be even numbers.

* * * * *